United States Patent [19]

Olsson et al.

[11] Patent Number: 5,010,124

[45] Date of Patent: Apr. 23, 1991

[54] FLOWABILITY IMPROVING AGENT, PROCESS FOR THE PRODUCTION THEREOF AND USE THEREOF

[75] Inventors: Lars-Inge R. Olsson, Helsingborg; Kent F. Hamacek, Perstorp, both of Sweden

[73] Assignee: Perstorp AB, Perstorp, Sweden

[21] Appl. No.: 302,941

[22] Filed: Jan. 30, 1989

[30] Foreign Application Priority Data

Jan. 29, 1988 [SE] Sweden ............................... 8800295

[51] Int. Cl.$^5$ ...................... C08K 5/521; C08L 73/00
[52] U.S. Cl. ........................................ 524/141; 524/3; 524/367; 524/375; 106/630; 106/631; 106/634; 106/681; 106/686; 106/689; 106/696; 106/743
[58] Field of Search ............... 524/375, 367, 141, 3; 106/743, 696, 689, 781, 686, 630, 631, 634

[56] References Cited

U.S. PATENT DOCUMENTS

| 2,730,516 | 1/1956 | Suen et al. | 528/239 |
| 3,976,494 | 8/1976 | Kudo et al. | 106/14.45 |
| 4,284,433 | 8/1981 | Aignesberger et al. | 106/781 |

FOREIGN PATENT DOCUMENTS 0219132  4/1987  European Pat. Off. .

*Primary Examiner*—Paul R. Michl
*Assistant Examiner*—Christopher P. Rogers
*Attorney, Agent, or Firm*—Stevens, Davis, Miller & Mosher

[57] ABSTRACT

Flowability improving agent comprising a combination of (A) a sulphonated melamine-formaldehyde resin, a sulphonated melamine-urea-formaldehyde resin or a sulphonated naphthalene-formaldehyde resin and (B) a compound of the general formula

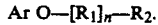

13 Claims, No Drawings

FLOWABILITY IMPROVING AGENT, PROCESS FOR THE PRODUCTION THEREOF AND USE THEREOF

The present invention relates to a flowability improving agent, a process for the production thereof and a use thereof.

The flowability improving agent is mostly intended as an additive to a composition containing cement, lime and/or gypsum.

It is well-known that cement-based-mixtures, for instance mortar, plaster, concrete, putty and screeding, are composed in such a way that they contain a surplus of water as compared to the minimum amount necessary for the curing or binding reaction of the cement.

If you tried to use exactly the amount of water necessary for the curing, the mixture would have an unsatisfactory consistency and workability due to the strong attractive forces between the cement particles.

On the other hand, too high a water content in the mixture mentioned results in a drastic decrease of the strength of the cured mixture. However, to a certain extent, this can be compensated by an increase of the cement content of the composition of the mixture. Too high a content of cement per unit of volume, however, the negative effect that the heat release at the curing reaction results in crack formations and other less desirable effects. Also from an economical viewpoint, it is undesirable to use a higher content of cement than necessary.

Nowadays, cement-based mixtures are often pumped under pressure through a pipeline for use on the different building work sites. Then it is important that the mixture has pumpable consistency but not a too high a water content.

It was previously known to use certain concrete additives decrease the water content of the concrete mixture and at the same time achieve a good flowability. The best known of these additives are sulphonated naphthalense formaldehyde resins, sulphonated melamine formaldehyde resins and sodium and calcium salts of lignin sulphonic acid.

Thus, these known additives give a certain effect in the respect mentioned above, but in many cases it is desirable to a still better effect. Up to now, however, this has not been possible to attain.

According to the present invention, it has now quite unexpectedly been possible to solve the above problem and produce a flowability improving agent comprising a combination of (A) a sulphonated melamine-formaldehyde resin, a sulphonated melamine-urea-formaldehyde resin or a sulphonated naphthalene-formaldehyde resin and (B) a compound with the general formula $$Ar\ O\text{---}[R_1]_n\text{---}R_2$$

where

Ar is a possibly substituted benzene rest or naphthalene rest, $R_1$ is an oxyethylene group;
—$CH_2CH_2O$— or an oxypropylene group;

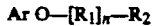

an oxyethylene chain or an oxypropylene chain with up to fifteen oxyethylene groups or oxypropylene groups or a combination of oxyethylene groups and oxypropylene groups to a chain where the sum of these groups is at most fifteen; the mean value $\bar{n}$ for n is 1–15 and $R_2$ is hydrogen or a phosphonate group of the formula

where $M_1$ and $M_2$ are hydrogen or alkali metal or where $R_2$ is a group of the formula

where $M_2$ has the above meaning and $M_3$ is —[$R_1$-]$_n$—O Ar where $R_1$, n and Ar have the above meanings.

The compound (A) of the flowability improving agent can be produced in many different ways. One suitable method is shown in the Swedish patent No. 7414830-5, which discloses sulphonated melamine-formaldehyde resins. The commercial product Melment L-10 sold by Cementa under the name Cementa flow additive V 33 as well as the products PERAMIN F ® and PERAMIN F $^P$®, both sold by Perstorp AB, can be used as component (A) of the present invention.

The published Japanese patent application No. 57-100959 also relates to production of sulphonated melamine-formaldehyde resins. Said process can also be used in the production of the component (A) above.

Furthermore, the U.S. Pat. No. 2,730,516, the Austrian patent No. 263,607 and the European patent No. 59,353 are mentioned and also relate to the production of sulphonated melamine-formaldehyde resins.

Sulphonated naphthalene-formaldehyde resins are also commercially available, for instance from the French company Compagnie Francaise De Produits Industriels.

Certain embodiments of the component (B) of the flowability improving agent are disclosed in the German patent No. 2,461,359. Said patent concerns a method of preventing corrosion on iron and steel in cement products containing chlorides. To prevent the corrosion, a mixture of nitrite and a polyoxyethylene phosphoric acid ester, an alkyl phosphoric acid ester, a phenyl phosphoric acid ester or an alkylaryl phosphoric acid ester or a combination of nitrite and a boric acid ester is added to the cement.

The addition of the mentioned phosphoric acid ester and boric acid ester respectively to the nitrite is said to increase the Rust-protecting properties of the nitrite on the iron and steel in the concrete. By the way, from examples 27–35 in Table 1 of the German patent, it is evident that the phosphoric acid ester does not per se give any Rust-protecting effect.

Consequently, the presence of nitrite in the known mixture is quite necessary.

No flowability improving effect at all of the known additive is mentioned in the German patent. This is rather natural in itself, since neither the known combination of nitrite and phosphoric acid ester, nor solely phosphoric acid ester gives any such effect. This will be shown below.

Accordingly, the present invention solves a totally different problem than that overcome by the German patent.

It is very surprising that you can achieve a flowability improving effect according to the present invention by a combination of the components (A) and (B) above. As mentioned above, the component (B) does not per se give any flowability improving effect at all on the present products.

According to a preferred embodiment of the invention, $R_1$ in the compound (B) is an oxyethylene group and $\bar{n}$ is 1–6.

In another preferred embodiment of the invention, $R_1$ in the compound (B) consists of an oxypropylene group, whereby $\bar{n}$ is 3–8.

Ar in the compound (B) is preferably a benzene rest and $R_2$ is a phosphonate group of the formula

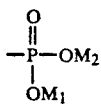

where $M_1$ and $M_2$ are hydrogen or alkali metal.

It is very suitable to use a sulphonated melamine-formaldeyde resin or a sulphonated melamine-urea-formaldehyde resin as component (A).

The flowability improving agent consists of 0.5–30%, preferably 0.5–20% by weight of (B) and 99.5–70%, preferably 99.5–80% by weight of (A) calculated on a dry product.

Of course, this composition can then be mixed with other components on condition that they do not impair the properties of the flowability improving agent.

If Ar in the compound (B) is substituted with an alkyl group, this should preferably consist of short chains, such as $CH_3$, $C_2H_5$ or $C_3H_7$.

Polyoxyalkyl phosphoric acid esters do not produce a good flowability improving ability in combination with the component (A).

In one process for the production of the flowability improving agent according to the present invention, the compound (B) above is added during the production of a sulphonated melamine-formaldehyde resin or a sulphonated melamine-urea-formaldehyde resin (A).

Usually, an acid reaction step is included in the production of such resins. There, the low pH value is brought about by means of an acid catalyst, for example, consisting of an inorganic acid such as sulphuric acid, an organic acid or another acid compound.

Advantageously, the component (B) can be added at said step. If the compound (B) has a phosphonate group, this can work as an acid catalyst and then wholly or partly replace the above catalysts, which are usual in this connection.

However, the component (B) can also be added at another step in the production of the resin (A), especially if the component (B) has no phosphonate group.

Finally, the component (B) can be added to a finished resin (A).

An addition of the component (B) in more than one step is also possible.

Even if the flowability improving agent according to the present invention has been disclosed above as an additive to cement- and/or gypsum containing compositions, it is useful for virtually all compositions containing one or more of the following products; cement, lime, gypsum, talc, chalk or titanium dioxide.

The invention will be further explained in connection with the embodiment examples below, of which examples 1–6 relate to the production of different flowability improving agents according to the present invention, while examples 7–10 show different technical experiments, where these agents were used.

EXAMPLE 1

1114.0 g water and 753 g 37% formaldehyde were charged into a reaction bulb made of glass. 280 g melamine, 54.5 g urea and 291 g sodiummetabisulphite were added while stirring. The reaction mixture was heated to 75° C. while stirring. When the melamine, the urea and the sodiummetabisulphite had been completely dissolved and the reaction mixture had cleared up, 15.0 g 46% sodium hydroxide was added to get a pH of 10.5–11.2. The reaction mixture was kept at 75° C. until free sulphite could not be detected any longer (about 0.5–2 h).

Then the reaction mixture was cooled down to 50° C. Thereafter, 66.0 g of a compound (B) as disclosed above, where Ar is phenol, $R_1$ is—$CH_2CH_2O$—, $\bar{n}$ is 4 and $R_2$ is

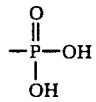

and 10.0 g 96% sulphuric acid were added, whereby a pH of 5.2 was obtained. The condensation reaction was then continued for about 4 hours until a viscosity of 170 cp (Emilia) was obtained. Then the reaction mixture was cooled to 35° C. and the pH was adjusted to 10.8 with 41.0 g 46% sodium hydroxide to give the condensation product a satisfactory storage stability.

EXAMPLE 2

970 g PERAMIN F ® from Perstorp AB and 30 g of the component B disclosed in example 1 were mixed while stirring at a temperature of 35° C. until a homogeneous mixture was obtained. Then the pH was adjusted by the addition of sodium hydroxide.

EXAMPLE 3

The process according to Example 2 was repeated with the difference that a compound B, where Ar is phenol $R_1$ is 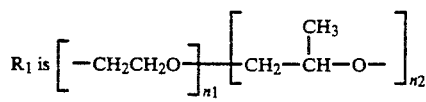

$\bar{n}_1$ is 4 and
$\bar{n}_2$ is 3 and
$R_2$ is

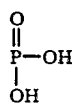

was used.

EXAMPLE 4

970 g sulphonated naphtalene-formaldehyde resin, GALORYL® LH 1640 from Compagnie Francaise De Produits Industriels was mixed while stirring at 35° C. with 30 g of a compound B, where
Ar is phenol
$R_1$ is —$CH_2CH_2O$—
$\bar{n}$ is 4 and
$R_2$ is

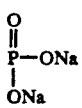

until a homogeneous mixture was obtained.

EXAMPLE 5

The product produced according to Example 1 was spray dried to a dry powder.

EXAMPLE 6

The product produced according to Example 2 was spray dried to a dry powder.

EXAMPLE 7

A cement mortar with the following composition was mixed:
- 230 g sand (0–1 mm)
- 180 g cement (Slite Std P)
- 180 g limestone powder
- 13 g hydraulic lime
- 10 g alumina cement 375 g of the above mixture was removed and mixed with different dosages of a flowability improving agent. The cement mortar was mixed with 69.2 g water over 2 minutes and then charged into a steel ring with an inner diameter of 80 mm and a height of 40 mm. The ring was placed on an even underlayer. The ring was then lifted when it had been filled and the flow of the cement mortar was measured to determine the flowability improving effect.

| Flow cm: Flowability improving agent | Dosage | | | | | | | |
|---|---|---|---|---|---|---|---|---|
| | 2 g | 3 g | 4 g | 6 g | 8 g | 10 g | 15 g | 20 g |
| PERAMIN $F^P$ (powder) | 8.5 | 18.0 | 23.0 | 25.5 | 26.0 | 26.0 | 25.0 | 24.5 |
| Product according to Example 6 | 18.0 | 24.0 | 26.0 | 27.0 | 27.5 | 27.0 | — | — |
| Product according to Example 5 | 11.0 | 24.0 | 26.0 | 27.0 | 27.0 | 28.0 | 28.0 | 28.0 |

The above results show that a considerable flowability improvement is achieved at low dosages of the products according to the invention as compared to the known product PERAMIN F®.

EXAMPLE 8

A cement mortar with the following composition was mixed:
- 230 g sand (0–1 mm)
- 180 g cement (Slite Std P)
- 10 g alumina cement
- 180 g limestone powder
- 13 g hydraulic lime 375 g of the above mixture was removed and mixed with 8 g flowability improving agent. The cement mortar was then mixed with 69.2 g water at 0% water reduction. The amount of water was then gradually reduced to test the water reducing ability of the flowability improving agent. Otherwise the test was made in the same way as according to Example 7.

| Spread cm Cement additive | Water reduction % | | | | | | |
|---|---|---|---|---|---|---|---|
| | 0 | 5 | 10 | 15 | 17 | 20 | 21 |
| PERAMIN $F^P$ | 26.0 | 24.0 | 21.0 | 17.0 | 11.0 | 8.0 | 8.0 |
| According to Example 6 | 27.5 | 25.5 | 23.5 | 22.0 | 21.0 | 20.5 | 19.0 |
| According to Example 5 | 27.0 | 24.0 | 23.0 | 21.5 | 18.5 | 16.0 | 14.0 |

The above results show that a good workability of the cement mortar can be maintained also at a considerable water reduction by the addition of the flowability improving agent according to the present invention.

EXAMPLE 9

330 g Std Portland cement and 99 g water were mixed for two minutes to a homogeneous paste. Then 4.3 g (1.3% dosage calculated on the weight of the cement) of the 35% flowability improving agent was added. The flowability improving agent was then mixed with the cement paste for another 2 minutes. A steel ring with an inner diameter of 80 mm and a height of 40 mm was placed on an even underlayer and filled with the easily flowing cement paste. When the steel ring is lifted, the spread of the cement paste gives a measure of the flowability improving effect of the additive used.

| Additive | Spread (mm) |
|---|---|
| Product according to Example 1 | 265 mm |
| Product according to Example 2 | 270 mm |
| Product according to Example 3 | 260 mm |
| Product according to Example 4 | 270 mm |
| PERAMIN F | 200 mm |
| Galoryl LH 1640 | 220 mm |
| Component B according to Example 1 | 80 mm |
| Component B + sodium/nitrite (9:1) | 80 mm |

The above results show that the flowability improving agent according to the present invention gives a very good effect also in a cement paste. However, component B and a mixture of component B and sodium nitrite, respectively, did not give any flowability improving effect at all in the cement paste.

EXAMPLE 10

A concrete with the following composition was produced:

| Cement Std Portland | 290.0 kg/m³ |
|---|---|

| | Dosage % | | | Strength SS137210 | | |
|---|---|---|---|---|---|---|
| Additive | on the content | Slump SS137124 | Water/cement ratio | 1 day MPa | 7 days MPa | 28 days MPa |
| Without additive | — | 75 mm | 0.638 | 10.7 | 26.5 | 34.9 |
| PERAMIN F | 1.3 | 85 mm | 0.562 | 17.8 | 35.1 | 45.0 |
| According to Ex 1 | 1.3 | 75 mm | 0.543 | 12.5 | 39.1 | 50.0 |
| According to Ex 2 | 1.3 | 85 mm | 0.535 | 24.0 | 41.0 | 52.1 |

-continued

| Gravel 0-1 mm | 422.7 kg/m³ |
| Gravel 1-2 mm | 255.6 kg/m³ |
| Gravel 2-4 mm | 245.7 kg/m³ |
| Gravel 4-8 mm | 59.0 kg/m³ |
| Stone 8-16 mm | 812.0 kg/m³ |

The dosage of the additive was calculated on the weight of the cement. The dry content of the additive was 35.0%.

Compressive strength cubes were produced from the concrete mixtures according to SS 137210 (15×15×15 cm), whereupon the strength was measured at different points of time. The storage temperature was 20° C.±2° C.

The above results show that a high strength of the contrete is obtained at the use of the agent according to the present invention. This can be attributed to a decrease of the water/cement ratio.

The present invention is not limited to the embodiments shown, since these can be modified in different ways within the scope of the invention.

What is claimed is:

1. A flowability improving agent, comprising a combination of (A) a member selected from the group consisting of a sulphonated melamine-formaldehyde resin, a sulphonated melamine-urea-formaldehyde resin and a sulphonated naphthalene-formaldehyde resin, and (B) a compound of the formula Ar O—[R$_1$]$_n$—R$_2$ where
Ar is a benzene residue or naphthalene residue which may be substituted by a short chain alkyl, R$_1$ is oxyethylene;
—CH$_2$CH$_2$O— or oxypropylene;

$$-CH_2-\underset{\underset{CH_3}{|}}{CH}-O-,$$

an oxyethylene chain or an oxypropylene chain with up to fifteen oxyethylene groups or oxypropylene groups or a combination of oxyethylene groups and oxypropylene groups to a chain where the sum of these groups is at most fifteen; the mean value n for n is 1-15 and R$_2$ is hydrogen or a phosphonate group of the formula $$-\underset{\underset{OM_1}{|}}{\overset{\overset{O}{\|}}{P}}-OM_2$$

where M$_1$ and M$_2$ are hydrogen or alkali metal or where R$_2$ is a group of the formula $$-\underset{\underset{M_3}{|}}{\overset{\overset{O}{\|}}{P}}-OM_2$$

where M$_2$ has the above meaning and M$_3$ is—[R$_1$]$_n$—O Ar where R$_1$, n and Ar have the above meanings.

2. The flowability improving agent according to claim 1, wherein Ar in the compound B is a substituted benzene residue or a substituted naphthalene residue.

3. The flowability improving agent according to claim 1, wherein R$_1$ in the compound B is oxyethylene and $\bar{n}$ is 1-6.

4. The flowability improving agent according to claim 1, wherein R$_1$ in the compound B is oxypropylene and $\bar{n}$ is 3-8.

5. The flowability improving agent according to claim 1, wherein Ar in the compound B is a benzene residue and R$_2$ is phosphonate of the formula $$-\underset{\underset{OM_1}{|}}{\overset{\overset{O}{\|}}{P}}-OM_2$$

where M$_1$ and M$_2$ are hydrogen or alkali metal.

6. The flowability improving agent according to claim 1, wherein the agent contains 0.5-30% by weight of compound B and 99.5-70% by weight of resin A calculated on a dry product.

7. The flowability improving agent according to claim 1, wherein the agent contains 0.5-20% by weight of compound B and 99.5-80% by weight of resin A calculated on a dry product.

8. The flowability improving agent according to claim 2, wherein Ar in the compound B is substituted with alkyl.

9. The flowability improving agent according to claim 2, wherein Ar in the compound B is substituted with CH$_3$, C$_2$H$_5$ or C$_3$H$_7$.

10. A process for the production of a flowability improving agent, wherein a compound B of the formula Ar O—[R$_1$]$_n$—R$_2$ where
Ar is a benzene residue or naphthalene residue which may be substituted by a short chain alkyl, R$_1$ is oxyethylene;
—CH$_2$CH$_2$O— or oxypropylene $$-CH_2-\underset{\underset{CH_3}{|}}{CH}-O-,$$

an oxyethylene chain or an oxypropylene chain with up to fifteen oxyethylene groups or oxypropylene groups or a combination of oxyethylene groups and oxypropylene groups to a chain where the sum of these groups is at most fifteen; the mean value n for n is 1-15 and $R_2$ is hydrogen or phosphonate of the formula $$-\overset{O}{\underset{OM_1}{\overset{\|}{P}}}-OM_2$$

where $M_1$ and $M_2$ are hydrogen or alkali metal or $R_2$ is a group of the formula $$-\overset{O}{\underset{M_3}{\overset{\|}{P}}}-OM_2$$

where $M_2$ has the above meaning and $M_3$ is $-[R_1]_n-O$ Ar where $R_1$, n and Ar have the above meanings is added during the production of a resin A selected from the group consisting of a sulphonated melamine-formaldehyde resin or a sulphonated melamine-urea-formaldehyde resin.

11. A process according to claim 10, wherein Ar in the compound B is a substituted benzene residue or a substituted naphtalene residue.

12. A composition with improved flowability comprising at least one member (C) selected from the group consisting of cement, lime, gypsum, talc, chalk and titanium dioxide and a flowability improving agent comprising 99.5-70% by weight calculated on a dry product of a member (A) selected from the group consisting of a sulphonated melamine-formaldehyde resin, a sulphonated melamine-urea-formaldehyde resin and a sulphonated naphthalene-formaldehyde resin and 0.5-30% by weight of a compound (B) of the formula Ar O—$[R_1]_n$—$R_2$ where
Ar is a benzene residue or naphthalene residue which may be substituted by a short chain alkyl, $R_1$ is oxyethylene;
—$CH_2CH_2O$— or oxypropylene;

$$-CH_2-\overset{CH_3}{\underset{}{\overset{|}{C}H}}-O-,$$

an oxyethylene chain or an oxypropylene chain with up to fifteen oxyethylene groups or oxypropylene groups or a combination of oxyethylene groups and oxypropylene groups to a chain where the sum of these groups is at most fifteen; the mean value $\bar{n}$ for n is 1-15 and $R_2$ is hydrogen or phosphonate of the formula $$-\overset{O}{\underset{OM_1}{\overset{\|}{P}}}-OM_2$$

where $M_1$ and $M_2$ are hydrogen or alkali metal.

13. A composition according to claim 12, wherein Ar in the composition B is a substituted benzene residue or a substituted naphtalene residue.

* * * * *